United States Patent
Kosseifi et al.

(10) Patent No.: US 12,172,535 B2
(45) Date of Patent: Dec. 24, 2024

(54) UNMANNED AERIAL VEHICLE DRIVE TESTING AND MAPPING OF CARRIER SIGNALS

(71) Applicant: AT&T Intellectual Property I, L.P., Atlanta, GA (US)

(72) Inventors: Mario Kosseifi, Roswell, GA (US); Giuseppe De Rosa, Atlanta, GA (US); Ronald Kiefer, Louisville, KY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 64 days.

(21) Appl. No.: 17/646,417

(22) Filed: Dec. 29, 2021

(65) Prior Publication Data
US 2022/0118870 A1    Apr. 21, 2022

Related U.S. Application Data

(63) Continuation of application No. 16/898,242, filed on Jun. 10, 2020, now Pat. No. 11,241,969, which is a
(Continued)

(51) Int. Cl.
*G01C 23/00*    (2006.01)
*B60L 53/30*    (2019.01)
(Continued)

(52) U.S. Cl.
CPC ............. *B60L 53/305* (2019.02); *B60L 53/30* (2019.02); *B60L 53/51* (2019.02); *G01S 19/42* (2013.01);
(Continued)

(58) Field of Classification Search
CPC ........ B60L 53/305; B60L 53/51; B60L 53/30; H04W 4/44; H04W 16/18; G01S 19/42;
(Continued)

(56) References Cited

U.S. PATENT DOCUMENTS

| | | |
|---|---|---|
| 8,818,705 B2 | 8/2014 | Spata |
| 8,989,922 B2 | 3/2015 | Jones et al. |

(Continued)

FOREIGN PATENT DOCUMENTS

| | | |
|---|---|---|
| CN | 103313259 A | 9/2013 |
| CN | 203968383 U | 11/2014 |

(Continued)

OTHER PUBLICATIONS

Non-Final Office Action received for U.S. Appl. No. 15/480,028 dated Sep. 9, 2019, 11 pages.
(Continued)

*Primary Examiner* — Adam M Alharbi

(57) ABSTRACT

Unmanned aerial vehicle drive testing and mapping of carrier signals is disclosed. An example method may include determining that an unmanned aerial vehicle is travelling on a flight route at an altitude for determination of network performance of a cellular network. The method may further include determining, using an antenna, signal diagnostics of the cellular network during travel of the unmanned aerial vehicle on the flight route. The method may conclude with transmitting the signal diagnostics of the cellular network to a service provider.

20 Claims, 6 Drawing Sheets

Related U.S. Application Data continuation of application No. 15/480,028, filed on Apr. 5, 2017, now Pat. No. 10,690,781.

(51) Int. Cl.

| | | |
|---|---|---|
| *B60L 53/51* | (2019.01) | |
| *G01S 19/42* | (2010.01) | |
| *G05D 1/00* | (2006.01) | |
| *G08G 5/00* | (2006.01) | |
| *G08G 5/04* | (2006.01) | |
| *H04B 7/00* | (2006.01) | |
| *H04L 67/125* | (2022.01) | |
| *H04W 4/44* | (2018.01) | |
| *H04W 16/18* | (2009.01) | |
| *H04B 17/318* | (2015.01) | |
| *H04W 4/38* | (2018.01) | |
| *H04W 84/04* | (2009.01) | |
| *H04W 84/06* | (2009.01) | |

(52) U.S. Cl.
CPC ......... *G05D 1/0094* (2013.01); *G08G 5/0013* (2013.01); *G08G 5/0034* (2013.01); *G08G 5/006* (2013.01); *G08G 5/0069* (2013.01); *G08G 5/045* (2013.01); *H04B 7/00* (2013.01); *H04L 67/125* (2013.01); *H04W 4/44* (2018.02); *H04W 16/18* (2013.01); *H04B 17/318* (2015.01); *H04W 4/38* (2018.02); *H04W 84/042* (2013.01); *H04W 84/06* (2013.01); *Y02T 10/70* (2013.01); *Y02T 90/16* (2013.01)

(58) Field of Classification Search
CPC .. G05D 1/0094; G08G 5/0013; G08G 5/0034; G08G 5/006; G08G 5/0069; G08G 5/045; H04B 7/00; H04L 67/125
See application file for complete search history.

(56) References Cited

U.S. PATENT DOCUMENTS

| | | | |
|---|---|---|---|
| 9,182,480 | B2 | 11/2015 | Larson et al. |
| 9,224,302 | B1 | 12/2015 | Young et al. |
| 9,363,690 | B1 | 6/2016 | Singh et al. |
| 9,439,092 | B1 | 9/2016 | Chukka et al. |
| 9,456,361 | B1 | 9/2016 | Levy et al. |
| 9,467,922 | B1 | 10/2016 | Buchmueller et al. |
| 9,847,035 | B1* | 12/2017 | Melamed ............ G01R 23/167 |
| 9,866,313 | B1* | 1/2018 | Murphy ................ G08G 5/006 |
| 10,860,115 | B1 | 12/2020 | Tran |
| 2013/0320212 | A1 | 12/2013 | Valentino et al. |
| 2015/0223080 | A1 | 8/2015 | Pulleti et al. |
| 2015/0304869 | A1 | 10/2015 | Johnson et al. |
| 2015/0312774 | A1 | 10/2015 | Lau |
| 2015/0356482 | A1 | 12/2015 | Whipple et al. |
| 2016/0112116 | A1 | 4/2016 | Jalali et al. |
| 2016/0150427 | A1 | 5/2016 | Ramanath |
| 2016/0269917 | A1 | 9/2016 | Hillegas, Jr. et al. |
| 2016/0309337 | A1 | 10/2016 | Priest et al. |
| 2016/0356863 | A1 | 12/2016 | Boesch et al. |
| 2017/0019797 | A1* | 1/2017 | Rubio .................. G06V 10/993 |
| 2017/0355457 | A1* | 12/2017 | Terry .................. G08G 5/0013 |
| 2018/0102831 | A1* | 4/2018 | Murphy ............... H04W 64/00 |
| 2018/0158236 | A1 | 6/2018 | Priest |
| 2018/0211441 | A1 | 7/2018 | Priest et al. |
| 2018/0232871 | A1 | 8/2018 | Terry |
| 2018/0292844 | A1 | 10/2018 | Kosseifi et al. |
| 2018/0352375 | A1* | 12/2018 | Burgess ................. G08G 5/006 |
| 2020/0028602 | A1* | 1/2020 | Park ..................... H04B 17/309 |

FOREIGN PATENT DOCUMENTS

| | | |
|---|---|---|
| CN | 104808250 A | 7/2015 |
| CN | 105319449 A | 2/2016 |
| CN | 105792275 A | 7/2016 |
| KR | 20160126213 A | 11/2016 |
| WO | 2016/190793 A1 | 12/2016 |

OTHER PUBLICATIONS

"Paving the path to 5G: Optimizing commercial LTE networks for drone communication [video]." https://www.gualcomm.com/news/ong/2016/09/06/12aving-Path-5G-Optimizing-commercial-Lte-networks-drone-communication, Qualcomm, qualcomm.com, Sep. 6, 2016.

Miura, Ryu, et al. "Experiment of telecom/broadcasting mission using a high-altitude solar-powered aerial vehicle Pathfinder Plus." Wireless Personal Multimedia Communications, 2002, The 5th International Symposium, vol. 2, IEEE, 2002. http://ieeexolore.ieee.org/abstract/document/1088218/?reload=true.

Repko, Melissa. "AT&T looks to drones to inspect cell towers, boost coverage." Dallas News, dallasnews.com, Oct. 5, 2016. http://www.dallasnews.com/business/technology/2016/10/05/takingflight-att-looks-dronesto-inspect-cell-towers-boost-coverage.

Rosalie. "After the storm: Drone flights enable speedy cellular inspections." Drones at Work, dronesatwork. com, Oct. 23, 2016. http://www.dronesatwork.com/storm-drone-flights-enable-speedy-cellular-inspections/.

Badman, Lee. "Drones Take On Cell Tower Maintenance." Network Computing, networkcomputing.com, Nov. 5, 2014. http://www.networkcomputing.com/wireless/drones-take-cell-tower-maintenance/1616147531.

Notice of Allowance received for U.S. Appl. No. 16/898,242 dated Sep. 30, 2021, 24 pages.

* cited by examiner

UNMANNED AERIAL VEHICLE DRIVE TESTING AND MAPPING OF CARRIER SIGNALS

RELATED APPLICATIONS

The subject patent application is a continuation of, and claims priority to each of, U.S. patent application Ser. No. 16/898,242 (now U.S. Pat. No. 11,241,969), filed Jun. 10, 2020, and entitled "UNMANNED AERIAL VEHICLE DRIVE TESTING AND MAPPING OF CARRIER SIGNALS," which is a continuation of U.S. patent application Ser. No. 15/480,028 (now U.S. Pat. No. 10,690,781), filed Apr. 5, 2017, and entitled "UNMANNED AERIAL VEHICLE DRIVE TESTING AND MAPPING OF CARRIER SIGNALS," the entireties of which applications are hereby incorporated by reference herein.

TECHNICAL FIELD

This disclosure relates generally to wireless communication networks and drone device usage and, more particularly, to unmanned aerial vehicle drive testing and mapping of carrier signals.

BACKGROUND

Unmanned aerial vehicles (UAVs), also referred to as unmanned aerial systems (UASs) or more commonly, drones, may be mobile platforms capable of detecting information, delivering goods, handling objects, and/or performing other actions. UAVs may provide many benefits over manned vehicles, including lower operating costs, fewer dangers of usage and/or travel, and increased accessibility to areas that may be dangerous for normal human travel. Moreover, UAVs may capture specific sensor data (e.g., audio, image, video, and/or other sensor data) at a target location, deliver goods (e.g., packages, medical supplies, food supplies, engineering materials, etc.) to the target location, handle objects (e.g., retrieving objects, operating equipment, repairing equipment, etc.) at the target location, and so forth without the need for a human to perform such actions. UAVs may be preprogrammed to travel a specific route, and therefore not require constant communication between the UAVs and a base or control station controlling and directing the UAVs. However, in certain scenarios it may be beneficial or required to maintain constant contact with the UAVs in order to direct the UAVs in real-time or adjust a previously programmed course. Thus, the actions performed by the UAVs may require maintaining network connectivity, such as connectivity to a cellular network. However, connectivity may be affected by altitude (e.g., how high the UAV is located), which can reduce performance of the UAV. For example, ground objects and/or geographic landforms and effects may cause variations in signal reception from one or more signal transmitting stations compared to at altitude where such objects, landforms, and effects may not affect the signal transmissions.

SUMMARY

Using various embodiments, unmanned aerial vehicle drive testing and mapping of carrier signals may be performed utilizing access points of a cellular network and one or more UAVs travelling along set flight paths and communicating with the access points through a cellular technology signal, such as those signals communicated by base stations (e.g., access points) of the cellular network. Traditionally, cellular networks are optimized for devices connecting at a ground level, such as two meters off the ground where typical cellular devices (e.g., mobile phones) may generally operate. In such cases, ground level objects (e.g., buildings and other manmade objects, trees and other natural obstacles, etc.) and geographic conditions (e.g., landforms including hills, mountains, etc. that may affect signal transmissions) may cause signal interference, and therefore cellular base stations are optimized based on these factors for cellular devices affected by ground level obstacles. However, UAVs travelling at altitude may instead encounter little to no ground level interference from ground level objects and/or may encounter different signal interferences on the cellular network, such as multiple base station signals interfering at altitude.

In order to map the cellular network at altitude for determining signal interferences and/or problem spots in the cellular network, one or more devices may be utilized and instructed to travel set flight paths at one or more altitudes. The devices may be UAVs or any devices operated or to be operated at flight altitude. In this regard, as the devices travel the set flight paths, a specialized sensor or antenna may be included, attached to, on, or embedded within the devices to collect cellular network information. The information may correspond to network connectivity information, signal diagnostics, and/or performance conditions of the cellular network. The information may further include a three-dimensional position, including the altitude of the devices as they collect the cellular network information. The three-dimensional position may be measured from a ground level or may be relative to the location and position of the base stations used to facilitate network connectivity and communication with the aerial-based devices at flight altitudes through a cellular technology signal. In addition, the cellular network information may be transmitted to a processing entity, such as the cellular network carrier or provider, or a third party entity providing processing services to the cellular network carrier.

Using the network connectivity information, signal diagnostics, and/or performance conditions of the cellular network, a cellular network carrier or third party entity may map problem areas, hotspots, or other locations that indicate issues with network connectivity and/or messaging, such as interferences between two or more base stations transmitting the cellular technology signal (e.g., 3G, 4G, 4G LTE, 5G, etc.) for the cellular network. Such areas may indicate that the network should be adjusted or otherwise configured to address the performance issues at altitude. In this regard, the problem areas may be plotted or mapped in a three-dimensional map of the cellular network at multiple altitudes. The map may therefore be used for optimization of the cellular network along altitudes used for directing and navigating one or more UAVs.

In one or more embodiments, a device includes an antenna configured to detect cellular technology signal propagation of a network for a cellular technology signal. The device further includes a non-transitory memory storing instructions comprising at least one flight route for an unmanned aerial vehicle. The device also includes one or more hardware processors configured to execute instructions to cause the device to perform operations including retrieving the instructions from the non-transitory memory during operation of the unmanned aerial vehicle and instructing the unmanned aerial vehicle to operate according to the at least one flight route for the unmanned aerial vehicle. The operations further include detecting, using the antenna, signal performance on the network for the cellular technology signal during operation of the unmanned aerial vehicle on the at least one flight route and communicating the signal performance to at least one processing entity.

In one or more embodiments, a method for unmanned aerial vehicle drive testing and mapping of carrier signals includes determining that an unmanned aerial vehicle is travelling on a flight route at an altitude for determination of network performance of a cellular network; determining, using an antenna, signal diagnostics of the cellular network during travel of the unmanned aerial vehicle on the flight route; and transmitting the signal diagnostics of the cellular network to a service provider.

In one or more embodiments, another method for unmanned aerial vehicle drive testing and mapping of carrier signals includes receiving, from an unmanned aerial vehicle, performance conditions of a cellular network for a cellular network provider for the cellular network, wherein the performance conditions are detected by the unmanned aerial vehicle while traveling a travel route at an altitude for the unmanned aerial vehicle to travel during flight of the unmanned aerial vehicle. The method may further include determining signal interferences in signal coverage on the cellular network using the performance conditions and plotting the signal interferences in a three-dimensional map of signal coverage of the cellular network.

The scope of the subject application is defined by the claims, which are incorporated into this section by reference. A more complete understanding of embodiments of the subject application will be afforded to those skilled in the art, as well as a realization of additional advantages thereof, by a consideration of the following detailed description of one or more embodiments. Reference will be made to the appended sheets of drawings that will first be described briefly.

Figure 1:
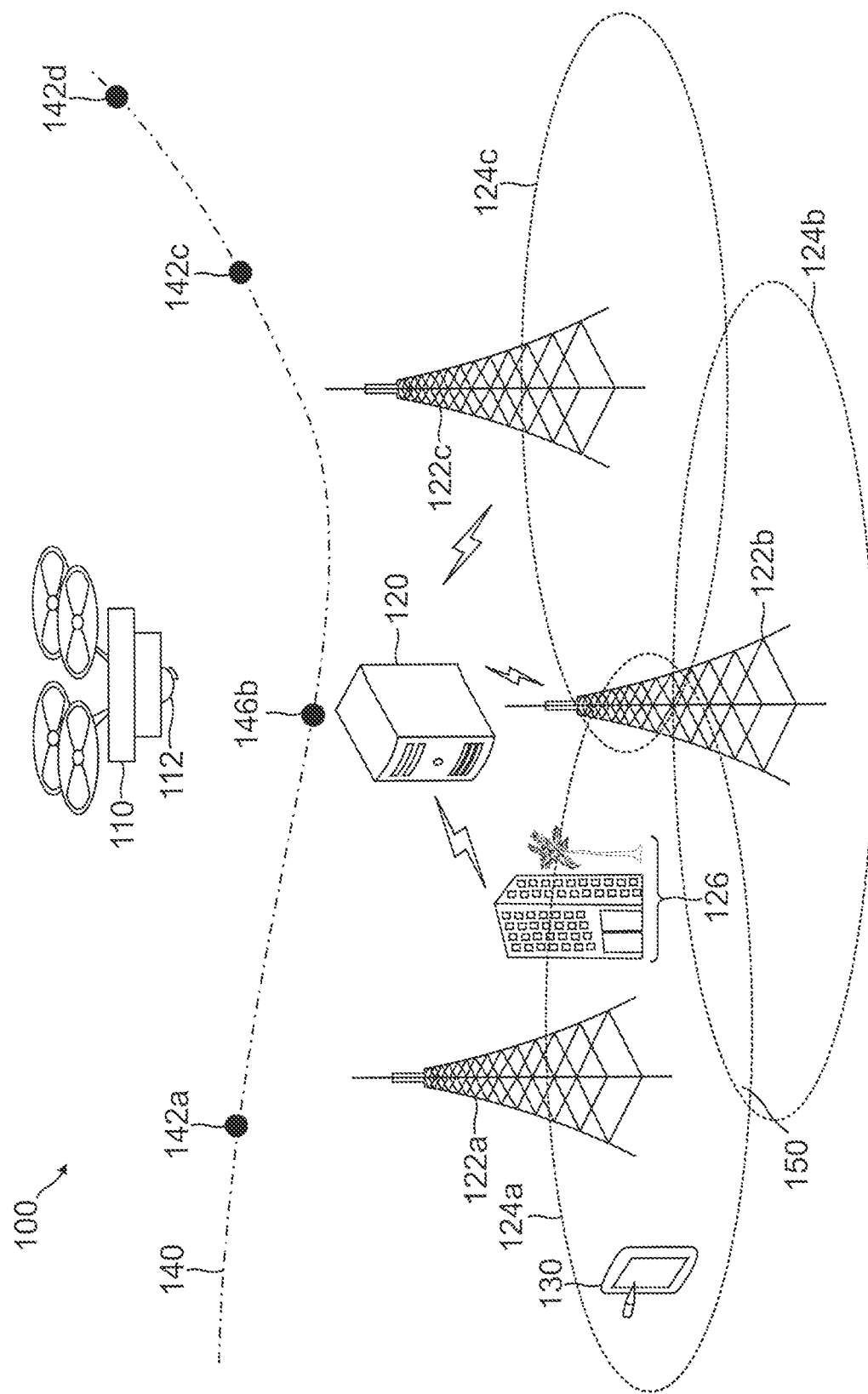
FIG. 1 illustrates an example of a network environment in which a system for testing and mapping of network connectivity by a UAV, according to an embodiment.

Embodiments of the present disclosure and their advantages are best understood by referring to the detailed description that follows. It should be appreciated that like reference numerals are used to identify like elements illustrated in one or more of the figures, where showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Various techniques are provided for unmanned aerial vehicle drive testing and mapping of carrier signals. Cellular network information may also be referred to as network or network signal information, network connectivity information, signal diagnostics, and/or performance conditions of a cellular network provided by a cellular network carrier or provider to facilitate communications between devices over the cellular network. The cellular network information may be detected by one or more unmanned aerial vehicles (UAVs), also referred to herein as unmanned aerial systems (UASs) or drones. These UAVs may travel at one or more altitudes according to a flight plan or route in order to detect the cellular network information.

Base stations of a cellular network are generally those base stations utilized with user endpoints (UEs, which may include cellular devices as well as the UAVs discussed herein) at ground level or near ground level, such as vehicles (e.g., cars) and mobile phones operated at or near ground level. For example, position and orientation (e.g., tilt) of antennas of the base stations may be configured to provide higher signal strength for devices below these antennas. In this regard, the base stations may be designed with a main antenna pattern that primarily encompasses a ground region. Furthermore, at lower altitudes, obstructions such as buildings and trees may help prevent signals from multiple base stations from reaching the vehicles and devices at or near ground level with signal strengths that cause significant interference.

When radio modules, such as 3G, 4G, 4G Long Term Evolution (LTE), 5G, other $3^{rd}$ Generation Partnership Project (3GPP)-based radio modules, and/or other radio modules, are placed at flight altitude, such as 400 feet or 500 feet, the line of sight propagation of signals from multiple base stations may be received by the radio modules and cause interference. The different antenna patterns (e.g., different vertical antenna patterns) of the base stations at different radio frequencies (e.g., in different frequency bands) and/or at different altitudes may cause degradation of communicated signals, including signals associated with application data and command/control functions. In addition, higher altitudes generally have fewer obstructions than at ground level, and thus more signals may reach the devices/vehicles at higher altitudes and cause interference relative to devices/vehicles at ground level. The aerial devices/vehicles (e.g., UAVs) may include antennas to receive radio signals from one or more base stations, such as a closest base station and/or a base station associated with highest signal strength. However, at altitude, the aforementioned issues become apparent to radio signals received by the UAVs.

In some embodiments, the cellular network information may be provided to the cellular network carrier to determine interferences, network connectivity and/or messaging issues, or other issues with network performance at the altitudes and/or along the flight routes of the UAVs, as discussed herein. In this regard, by way of non-limiting example, the cellular network information may include the aforementioned interferences in cellular network signaling, network connectivity issues in the cellular network signals, messaging errors on the cellular network, and/or other signal diagnostics for cellular network signals on the cellular network. The cellular network information may also include information detected at the time of or corresponding to the capture of the aforementioned signal diagnostics, including position information of the UAV at the time of capture, obstacle information around the UAV, weather information around the UAV and/or generally any other static and dynamic information associated with capture of the cellular network information.

In order to perform carrier network testing for coverage and performance of radio signals of the cellular network at various altitudes and in a three-dimensional space, one or more UAVs may be employed. The UAV(s) may be equipped with either a specialized cellular technology (e.g., using LTE or other cellular technology communication signal) test device that may be mounted to the UAV(s) (e.g., as a separate connected module or component), or a specialized Internet of Things (IoT) cellular (e.g., similarly using LTE or other cellular technology communication signal) radio unit can be embedded inside the UAV, which uses the cellular radio coverage of the cellular network. The UAV having the test data collecting device may be deployed to follow, travel along, or otherwise execute one or more flight paths. The UAV may therefore be given a route or a set of routes to autonomously fly at one time, where the test device of the UAV may collect the network signal information during flight along the route(s). The route or set of routes may also be flown at different altitudes to collect network signal information at different heights/altitudes travelled by the drone. Moreover, this may be implemented for multiple flights and/or multiple drones to collect a wide area of network coverage for the cellular network.

Thus, the UAVs having the test devices may collect and report diagnostic measurements of network coverage and network messaging as the cellular network information. The information of the cellular network diagnostics and measurements, as well as positional information and other associated information of the UAV, may be reported to the cellular network carrier/provider and/or a third party entity that performs maintenance, updating, and/or configuration services for the cellular network carrier/provider. The information may be transmitted in real-time, for example, over the cellular network as the UAV operates to collect the information, which may include transmissions of data during times that the UAV has network connectivity, or may be stored to the UAV for transmission to the processing entity after completion of the route and/or retrieval of the UAV by the processing entity (e.g., landing after completion of the flight path and physical access to the UAV). The network may include a wide area network (WAN), such as a cellular-based WAN. In the case of a cellular network, the cellular network information may be provided for the cellular-based WAN. In an aspect, the cellular network information may be provided as part a broadcast message to the processing entity. For example, the information may be included in a master information block (MIB) message, system information block (SIB) message, Multimedia Broadcast Multicast Services (MBMS)-based message, Evolved MBMS (eM-BMS)-based message, and/or generally any message that can be transmitted (e.g., broadcasted) to and from the base stations of the cellular network and UAVs within receiving range of radio signals from the base stations.

Thus, the information transmitted to the processing entity may include network diagnostics, measurements, and/or interference issues present at altitude due to configuration of the access points/base stations for ground level use (e.g., two or more base stations having overlapping coverage and/or lack of coverage by one or more base stations at altitude). The cellular network information may further include position information in a three-dimensional (3D) space for the UAV. For example, the UAV of the network may transmit position information that includes a longitude coordinate, a latitude coordinate, and an altitude coordinate associated with the UAV when collecting the network diagnostics. The altitude coordinate may be a distance (e.g., height) from a reference sea level. In some cases, rather than the longitude, latitude, and/or altitude coordinates, other coordinate systems by which to define the position of the UAV relative to the access point/base station.

In an embodiment, the cellular network carrier may utilize the information to optimize its base stations, for example, for signal propagation planning and/or modification of its base station cellular signaling and/or antenna directions. Accordingly, in an embodiment, the three-dimensional (3D) position information of the UAVs capturing the cellular network information and the cellular network signal diagnostics, measurements, and/or interferences may be plotted or mapped into a 3D map of the cellular network and the associated radio signals. For example, the processed data may be displayed in a 3D format to show the 3D performance of the carrier network over different altitudes. The cellular network carrier may perform the plotting or a third party entity/software may perform the plotting. Thus, the cellular network carrier may be informed of problem areas (e.g., signal interferences, lack of signal coverage, issues with messaging and/or signal reception on the cellular network) in a 3D map of the cellular network in order to perform optimization.

In some aspects, although the UAVs are not communicating with base stations dedicated to aerial communication, the base stations may be configured to (e.g., programmed to) provide radio signals on the cellular network to accommodate (e.g., communicate with) the UAVs without disrupting service to UEs at ground level. In an aspect, the base stations may accommodate cellular communication with the UAVs with minimal or no changes to structural features, such as the housing, antennas, and/or other components, such that the use of the base stations with the UEs at ground level are not affected by the accommodation of UAVs through determining problem areas and optimizing the cellular network at altitude according to the problems areas.

In one embodiment, in order to accommodate flight length of the flight routes executed by the UAVs, a modified battery with solar power capability may be added to enable the UAVs to fly for longer flight durations/routes and/or execute additional flight routes. Additionally, the UAVs may be equipped with collision enabled sensors for flying autonomously in order to prevent collision with land-based and/or geographic objects, as well as other flying objects, including manned and unmanned aerial vehicles. Thus, the UAVs may be equipped with additional devices and sensors necessary for autonomous flying and collection of cellular network information.

Although the description of the present disclosure is made with respect to UAVs and cellular networks, the techniques described herein may be applied to any wireless networks and any devices/vehicles capable of establishing connectivity in such wireless networks. By way of non-limiting example, the devices/vehicles may include, or may be included in, devices or vehicles at or near ground level (e.g., mobile devices, cars), naval-based devices (e.g., watercraft), and devices at higher altitudes (e.g., UAVs, any device at higher altitudes). In this regard, the techniques described herein may be utilized for devices located at higher altitudes, such as mobile phones, vending machines, set-top boxes, and/or other devices/vehicles operated at higher floors of a building.

FIG. 1 illustrates an example network environment 100 in which a system for unmanned aerial vehicle drive testing and mapping of carrier signals may be implemented in accordance with one or more embodiments. Not all of the depicted components may be required, however, and one or more embodiments may include additional components shown in the figure. Variations in the arrangement and type of the components may be made without departing from the spirit or scope of the claims as set forth herein. Additional components, different components, and/or fewer components may be provided. It is noted that sizes of various components and distances between these components are not drawn to scale in FIG. 1.

In an embodiment, the network environment 100 is implemented to form part of a cellular network, such as a 3G, 4G, 5G, and/or other 3GPP-based cellular network, and/or a cellular network based on other cellular standards. In this regard, as an example, the description of FIG. 1 is made herein with respect to the network environment 100 providing a cellular network. However, in some examples, the network environment 100 may be additionally or alternatively implemented to form part of a satellite communication network, microwave radio network, and/or other wireless networks.

The network environment 100 includes a UAV 110, a cellular network carrier 120, base stations 122a-c, and a user device 130. UAV 110, cellular network carrier 120, base stations 122a-c, and user device 130 may be in communication directly or indirectly with each other. As used herein, the phrases "in communication," "communicatively connected," and variances thereof, encompass direct communication and/or indirect communication through one or more intermediary components and does not require direct physical (e.g., wired and/or wireless) communication and/or constant communication, but rather additionally includes selective communication at periodic or aperiodic intervals, as well as one-time events.

UAV 110 may include, may be a component of, and/or may be referred to as, a user endpoint or UE. UAV 110 may include a flight control unit, communication unit, and payload unit. The flight control unit or other operation module of UAV 110 may be configured to facilitate navigation of UAV 110, e.g., take off, landing, and flight of UAV 110. Such an operation module may include any appropriate avionics, control actuators, and/or other equipment, along with associated logic, circuitry, interfaces, memory, and/or code. Additionally, the flight control unit or other operation module may include a controller that receives flight route information from one or more sources, including a memory and/or external controller (e.g., set instructions from a service provider and/or inflight navigation/instructions from an operator) that operates UAV 110. In various embodiments, an LTE Category-M1 ("LTE CAT-M") IoT device may be utilized for flight control of UAV 110, which may limit speed and bandwidth consumption, thereby providing extended flight through decreased power use. Further, a separate battery may be provided for flight control, so that UAV 110 may be able to communicate with an entity, such as cellular network carrier 120, in the case of main system power failure or other types of issues during operation and flight of UAV 110.

The communication unit may include one or more radio transceivers (e.g., that include antennas) along with associated logic, circuitry, interfaces, memory, and/or code that enable communications, e.g. with one or more of base stations 122a-c, and/or directly with cellular network carrier 120, via wireless interfaces and using the radio transceivers. In FIG. 1, the radio transceivers of UAV 110 include an antenna 112, which may be omnidirectional or directional. Antenna 112 may be utilized to radiate and/or receive power uniformly in all directions, or one or more desired directions to allow increased performance (e.g., higher signal strength) in the desired direction, such as through higher gain and directivity and reduced interference due to signals from sources deviating from the desired direction. In this regard, signal strength of command/control links and/or application data channels may be improved, and/or interference of signals from different base stations may be reduced through the use of a directional antenna. Antenna 112 may be contained within a housing of UAV 110 (e.g., embedded within the housing and/or circuitry of UAV 110), or disposed (e.g., mounted) outside a housing of UAV 110 as an attachable and/or removable module. In some cases, the antenna 112 may be movable along and/or rotatable about one, two, or three axes. In other cases, the antenna 112 may be fixed (e.g., not movable and not rotatable). Antenna 112 may correspond to a specialized cellular technology (e.g., using LTE or other cellular technology communication signal) test device that may be mounted to the UAV(s) (e.g., as a separate connected module or component), or a specialized Internet of Things (IoT) cellular (e.g., similarly using LTE or other cellular technology communication signal) radio unit can be embedded inside the UAV, which uses the cellular radio coverage of the cellular network.

Antenna 112 may be used to measure signal strength, signal diagnostics, and/or interferences of cellular tower signals from base stations 122a-c. The signal strength may be, or may be based on, measurements such as received signal strength indicator (RSSI), reference signal received power (RSRP), reference signal received quality (RSRQ), signal-to-noise ratio (SNR), signal-to-interference-plus-noise ratio (SINR), and/or other measurements. Such measurements of signal strength may be detected and/or computed by UAV 110. In an aspect, signal strength may be referred to as signal quality, signal level, or signal power. A higher signal strength is generally associated with better reception. Additionally, antenna 112 may be used to message with one or more of base stations 122a-c to analyze message reception, clarity, and/or other measurements, as well as detect issues with messaging due to interference.

In some cases, the communication unit of UAV 110 may include suitable logic, circuitry, interfaces, memory, and/or code that enable wired communications, e.g. with one or more of base stations 122a-c, and/or cellular network carrier 120 directly. In this regard, UAV 110 may be configured to interface with a wired network, such as via an Ethernet interface, power-line modem, Digital Subscriber Line (DSL) modem, Public Switched Telephone Network (PSTN) modem, cable modem, and/or other appropriate components for wired communication. A wired link may be implemented with a power-line cable, coaxial cable, fiber-optic cable, or other cable or wires that support corresponding wired network technologies. For example, UAV 110 may utilize wired connections when at or near ground level, such as a wired connection between UAV 110 and one or more ground level devices or cellular network carrier 120 for facilitating testing and/or calibration/setup of UAV 110. In other embodiments, the communication unit may send and/or receive information, including flight paths and cellular network information, over a cellular technology signal/network (e.g., 3G, 4G, 5G, and/or other 3GPP-based cellular network) to one or more of base stations 122a-c. Thus, UAV 110 may wirelessly communicate with other devices using wireless standards, such as the Institute of Electrical and Electronics Engineers (IEEE) 802.11 standard, Bluetooth® standard, ZigBee® standard, and/or other wireless standards; cellular standards, such as 3G, 4G, 4G LTE, 5G, and/or other cellular standards; infrared-based communication; optical-based communications; and/or other appropriate communication standards and/or protocols. In some cases, UAV 110 may be configured to communicate with another device using a proprietary wireless communication protocol and interface.

The payload unit may be configured to implement features supported by UAV 110 and facilitate implementation of such features. The payload unit may include any equipment and associated logic, circuitry, interfaces, memory, and/or code. The payload unit may include a global positioning system (GPS) that provides a current position of UAV 110 (e.g., using three coordinates). The position information from the GPS, together with position information of devices in communication with UAV 110, may allow UAV 110 to execute a flight route as well as provide positioning information associated with collection of cellular network information. Thus, the components of the payload unit may allow UAV 110 may facilitate implementation of various features supported by UAV 110.

Depending on an application(s) of UAV 110, the payload unit may include one or more onboard sensors, which may be contained within a housing of UAV 110 or mounted outside the housing of UAV 110. By way of non-limiting example, sensors may include environmental sensors, such as temperature sensors, rain sensors, pressure sensors, humidity sensors, fog sensors, gas sensors, etc., or combination thereof; object/obstacle detection sensors, such as radar sensors, proximity sensors, motion detectors, etc., or combination thereof; imaging sensors (e.g., cameras); acoustic sensors, and/or other types of sensors, or combination thereof. Such sensors may be utilized to prevent collisions, and may include other necessary processing features for a collision avoidance system. Alternatively or in addition, the payload unit may include tools, actuators, robotic manipulators, etc., capable of performing an action, such as touching, grasping, delivering, and/or measuring objects. For delivery applications, the payload unit may include the object to be delivered, e.g. the object may be secured within a housing of UAV 110. Payload unit may also contain necessary rechargeable power sources, including a rechargeable solar battery and associated solar charging panel or photovoltaic charging source.

User device 130 may be, and/or may include, a mobile phone, a personal digital assistant (PDA), a tablet device, a computer, or generally any device that is operable to communicate wirelessly (e.g., via cellular standards using antennas) with UAV 110, cellular network carrier 120, and/or one or more of base stations 122a-c. In an aspect, user device 130 may be a device at ground level that utilizes the wireless network provided by cellular network carrier 120. In this regard, user device 130 may receive radio signals from one or more of base stations 122a-c, which may be configured to provide the wireless network to user device 130 based on ground level objects 126. Thus, the wireless network provided by one or more of base stations 122a-c may be specifically calibrated and/or configured for communication with user device 130 based on ground level objects 126.

In some cases, UAV 110 and user device 130 may be configured to interface with a wired network, such as via an Ethernet interface, power-line modem, DSL modem, PSTN modem, cable modem, and/or other appropriate components for wired communication. Alternatively or in addition, UAV 110 and/or user device 130 may support proprietary wired communication protocols and interfaces. UAV 110 and user device 130 may be configured to communicate over a wired link (e.g., through a network router, switch, hub, or other network device) for purposes of wired communication, e.g. such as during testing, setup, and/or calibration stages of UAV 110 and/or during use of user device 130. UAV 110 may be at or near ground level to receive a wired connection.

Although a single UAV and user device (e.g., UAV 110 and user device 130) is shown in FIG. 1, multiple UAVs and user devices (e.g., multiple UAVs and/or user devices) may be utilized and function similarly.

One or more of base stations 122a-c may include, may be a component of, and/or may be referred to as, a cell, a Node B (NB), an Evolved Node B (eNodeB or eNB), or a Home eNB (HeNB). One or more of base stations 122a-c include suitable logic, circuitry, interfaces, memory, and/or code that enable communications, e.g. with user device 130, one of the other base stations 122a-c, and/or cellular network carrier 120, via wireless interfaces and utilizing one or more radio transceivers (e.g., that include antennas). In an aspect, base stations 122a-c may transmit (e.g., broadcast) messages that, if received by UAV 110, facilitate navigation of UAV 110. In some cases, the messages transmitted by base stations 122a-c may be based on information base stations 122a-c receive from cellular network carrier 120. In some cases, one or more of base stations 122a-c may be mobile (e.g., mobile base stations at ground level, mobile base stations at flight altitudes, mobile naval-based base stations, etc.), in which case its position information is dynamic.

Base stations 122a-c may be macrocell base stations, microcell base stations, picocell base stations, femtocell base stations, and/or other cell sizes. For example, the macrocell base station may provide a coverage area over a radial range up to the tens or hundreds of kilometers, the picocell base station may provide coverage over a radial range in the hundreds of meters, and the femtocell base station may provide coverage over a radial range in the tens of meters. In FIG. 1, base stations 122a, 122b, and 122c have nominal coverage area 124a, 124b, and 124c, respectively, at ground level or near ground level. The coverage area of a base station may be different in different environments, at different altitudes, and at different frequency bands. For example, a base station may have a smaller coverage area on a rainy day than the same base station on a sunny day, e.g. due to attenuation of signals by rain. When altitudes are taken into consideration, the coverage area provided by base stations 122a-c may more appropriately be referred to as a coverage volume, with different coverage areas at different altitudes. In an aspect, a coverage area of a base station may be larger at flight altitudes (e.g., 400 feet) than at lower altitudes such as ground level, due to fewer obstructions at flight altitudes for example. As used herein, the coverage area and coverage volume may be referred to more generally as a coverage region, where the region may be two-dimensional (e.g., coverage area) or three-dimensional (e.g., coverage volume).

Cellular network carrier 120 may be, may include, and/or may be a component of, a core network for processing information from UAVs (e.g., UAV 110), user devices (e.g., user device 130), and/or base stations (e.g., base stations 122*a-c*) and managing connections of the UAVs and/or user devices to the base stations. For example, cellular network carrier 120 may be, may include, and/or may be in communication with, a mobile telephone switching office (MTSO). Cellular network carrier 120 and base stations 122*a-c* may be provided by a cellular network carrier or provider. Cellular network carrier 120 includes suitable logic, circuitry, interfaces, memory, and/or code that enable communications, e.g. with one or more of base stations 122*a-c* and/or one or more UEs (e.g., UAV 110 and user device 130), via wireless interfaces and utilize one or more radio transceivers. In this regard, cellular network carrier 120 may be dedicated to facilitate connectivity of UAVs (or other vehicles/devices at flight altitude) with base stations 122*a-c* (and/or other base stations), or may be utilized to facilitate connectivity of UAVs and ground-based devices with base stations 122*a-c* (and/or other base stations).

In an aspect, cellular network carrier 120 may be, may include, or may be a part of, a server (e.g., a centralized server) that can generate and distribute information to base stations 122*a-c*, as well as receive information from base stations 122*a-c*. Base stations 122*a-c* may then relay the information from cellular network carrier 120 to UAV 110 and/or user device 130. In some cases, when UAV 110 is in range of cellular network carrier 120, cellular network carrier 120 may transmit information directly to UAV 110 (e.g., through a wired or wireless signal). In an aspect, cellular network carrier 120 may provide each of base stations 122*a-c* with respective flight and/or travel route/path information (e.g., position, altitude, route, obstacle, weather, and other necessary information to navigate UAV 110) to be transmitted (e.g., broadcasted) to UAV 110. In other embodiments, cellular network carrier 120 may directly provide the information to UAV 110.

Base stations 122*a-c* may be in communication with cellular network carrier 120 through a backhaul network. Cellular network carrier 120 may be in direct communication with one or more of base stations 122*a-c* or in communication with one or more of base stations 122*a-c* through one or more intermediary base stations. For example, in FIG. 1, cellular network carrier 120 is in direct communication with base stations 122*a-c*. In other cases, a base station may be in communication with cellular network carrier 120 via one or more intervening base stations. In an embodiment, cellular network carrier 120 may determine and/or have access to signal strength statistics at different positions (e.g., altitudes) and/or different frequency bands, e.g. based on the measurement reports generated by the UEs, including UAV 110 and/or user device 130. In some cases, cellular network carrier 120 may determine preferred frequency bands to be utilized at various altitudes based on the signal strength statistics.

The flight path 140 may be a portion of a flight path along which UAV 110 is moving or intends to move in going from a starting point to a destination point. The flight path 140 may be defined by a set of positions, including positions 142*a-d* shown in FIG. 1, at which UAV 110 is located, has been located, or is expected to be located. The positions 142*a-d* may each be associated with a set of three-dimensional coordinates (e.g., longitude, latitude, altitude). For example, during mapping of cellular network coverage, the starting point may be a warehouse or takeoff point at which UAV 110 is provided with the travel route for execution.

At the position 142*a*, UAV 110 may be within coverage area 124*a* for base station 122*a*. Different base stations may provide better signal strength at the different positions 142*a-d* along flight path 140. For example, among base stations 122*a-c*, the base station 122*a* may be generally associated with the highest signal strength at the position 142*a*, whereas the base station 122*b* may have higher signal strength of position 142*b* and base station 122*c* may be generally associated with higher signal strength at the positions 142*c* and 142*d*.

As shown in FIG. 1, the coverage areas 124*a-c* of base stations 122*a-c* may overlap. The coverage areas 124*a-c* may represent the coverage areas of base stations 122*a-c* at ground level. UAV 110 may be within range of two or more of base stations 122*a-c*. For example, UAV 110 may be within range of the base stations 122*a* and 122*b* in an overlap region 150. Based on a specific position of UAV 110, signal strength between UAV 110 and the base station 122*a* may be different from (e.g., stronger than, weaker than) signal strength between UAV 110 and the base station 122*b*. In some cases, the overlap in the coverage regions may be more pronounced at flight altitudes than at ground level, such as due to fewer obstructions. Thus, overlap region 150 may correspond to interference areas or potential problem areas in coverage at altitude of base stations 122*a* and 122*b* when providing coverage areas 124*a* and 124*b*.

During mapping of the cellular coverage area, performance, diagnostics, and/or interferences of base stations 122*a-c* having coverage areas 124*a-c* during flight path 140, UAV 110 may collect radio signals, messaging, and other signal diagnostics and interferences from base stations 122*a-c* having coverage areas 124*a-c* based on measurements of relative signal strengths of signals from different base stations and interferences of similar signaling. In an aspect, the flight path 140 may be a pre-programmed flight path, e.g. preloaded by cellular network carrier 120 to UAV. For example, UAV 110 may communicate (e.g., directly or indirectly) with cellular network carrier 120 and provide a starting point (e.g., a current position of UAV 110) and a destination point. In response, cellular network carrier 120 may generate and provide to UAV 110 one or more potential flight paths. An operator of UAV 110 and/or user device 130 may select and/or confirm the flight path to be utilized. In further embodiments, during flight of UAV 110, UAV 110 may autonomously make adjustments to the flight path 140, or may be instructed on the flight path and/or adjustments to the flight path. The adjustments may be based on onboard sensors (e.g., for sensing obstacles, weather, etc., through one or more collision or other sensors) and/or based on information received from one or more of base stations 122*a-c* (e.g., obstacle, weather, traffic emergency information). In an aspect, UAV 110 may be operated to maintain a minimum distance separation between UAV 110 and other UAVs, and/or between UAV 110 and obstacles, e.g. such as minimum distance separation requirements or recommendations from the Federal Aviation Administration (FAA). In some cases, a flight path of UAV 110 may have a fixed altitude level (e.g., UAV 110 has to fly somewhere between a fixed minimum altitude level and a fixed maximum altitude level) and/or an operating frequency of UAV 110 may be within a fixed frequency band (e.g., fixed frequency range). Such parameters on the flight path of UAV 110 may be set by cellular network carrier 120 and/or flight regulations.

Thus, the flight path and/or connectivity between UAV 110 and the cellular network via base stations 122*a-c* (and/or other base stations) may be further facilitated through additional information such as obstacle, weather, traffic management information (e.g., air traffic management information), emergency broadcast information, and/or generally any other information that may be static or dynamic in the airspace that can be communicated to facilitate communication of UAV 110 with use of the cellular network. The obstacle information and weather information may identify obstacles (e.g., trees, buildings) and weather (e.g., rain, fog, hail) within coverage regions of the base stations 122a-122c, or portion thereof. For example, the base station 122a may provide position information (e.g., latitude, longitude, height) encompassed by the obstacles. The traffic management information may provide information indicative of signal strengths at different frequency bands and/or at different positions (e.g., altitudes, longitudes, and/or latitudes). In some cases, the traffic management information may provide preferred frequency bands at different altitudes. The emergency broadcast information may identify traffic incidences and/or no-fly zones (e.g., temporary no-fly zones due to these traffic incidences). Such information may allow UAV 110 to select the base station to connect with during flight, adjust a frequency band utilized for communication, and/or adjust a flight path (e.g., an altitude of various points along the flight path).

During or after execution of flight path 140 by UAV 110, antenna 112 may collect the cellular network information of signal diagnostics, measurements, and/or interferences from base stations 122a-c. As previously discussed, UAV 110 may include one or more sensors (e.g., antenna 112) used to detect cellular networking information, such as signal strength, network diagnostics, and/or messaging, during flight along a route set for UAV 110. In some aspects, the cellular network information includes position information of UAV 110 during collecting of the information. The information may include a longitude, latitude, and altitude of antenna 112, and/or information indicative of the longitude, latitude, and altitude (e.g., information from which cellular network carrier 120 may derive the longitude, latitude, and altitude). In some cases, rather than the longitude, latitude, and/or altitude coordinates, other coordinate systems by which to define the position of base stations 122a-c may be utilized. UAV 110 may maintain a wireless communication link between UAV 110 and one of base stations 122a-c in order to send and/or receive information at an acceptable signal strength during at least a portion of a flight path of UAV 110. Received information by UAV 110 may correspond to a flight path or route information, and/or any changes or deviations to the selected route. Additionally, sent information by UAV 110 may correspond to the collected cellular network information by antenna 112 of UAV 110.

The information may be streamed in real-time to one or more servers, including cloud computing server architecture, or may be retrieved from UAV 110 after flight. Cellular network carrier 120 and/or third party service provider may process the information and map the information to a 3D map of the cellular network coverage. The cellular network information may be used to highlight problem areas in a 3D space (e.g., latitude, longitude, and altitude), as well as optimized base stations 122a-c and coverage areas 124a-c at altitude, for example, by planning propagation of signals from base stations 122a-c having coverage areas 124a-c. Additionally, the cellular network information and/or plot of problem areas in 3D space may be used to select a base station for transmission of signals at specific locations in 3D (e.g., for a specific latitude, longitude, and altitude). The base station that is selected may differ at different altitudes and/or at different frequency bands used for communication. To facilitate connectivity between base stations 122a-c and UAVs (e.g., UAV 110) during flight of the UAVs, base stations 122a-c may receive detected cellular network information from the UAVs and/or the map or other informational output that indicates problem areas in cellular network coverage at altitude (e.g., in 3D). Thus, base stations 122a-c may be selected during flight path 140 based on the cellular network information. UAV 110 may therefore point at another base station when the signal strength and/or signal strength statistics associated with signals from the selected one of base stations 122a-c falls below a threshold value. In an aspect, the cellular networking and/or processed mapping and plotting in 3D of the cellular network information (e.g., a 3D map of relevant problem spots, interferences, signal blackout areas, etc.) may be accessible to and usable by one or more other third party devices and/or entities.

In an embodiment, UAV 110 may receive information (e.g., geographic information) from non-network devices (also referred to as non-network nodes). In this regard, base stations 122a-c and cellular network carrier 120 may be referred to as network devices or network nodes of the cellular network. In some cases, a non-network device may provide one-way communication from the non-network device to UAV 110. A non-network device may be placed at locations at or near an obstacle for example, and broadcast (e.g., using its antenna(s)) its position information and/or other geographic information to help prevent collision of UAV 110 and/or other UEs/UAVs with the obstacle. As an example, the non-network device may be placed at or near a tall tree. As another example, the non-network device may be placed at a location designated as a no-fly zone and utilized as a no-fly zone beacon. For instance, a traffic accident (e.g., whether between two cars at ground level, two UAVs, a car and a building, and so forth) may cause emergency helicopters and/or other aircrafts to deployed in and/or around the no-fly zone. UAV 110 may impede emergency response if flown in or around the no-fly zone.

Although FIG. 1 is described with respect to UAV 110, the UE may generally be any device, e.g. at ground level or at higher altitudes, that can collect cellular network information using an antenna 112. Although UAV 110 is depicted as including a single antenna, in some cases UAV 110 may have more and/or different antennas than those shown in FIG. 1. For example, in an aspect, UAV 110 does not include an omnidirectional antenna, and/or UAV 110 includes multiple directional antennas. In addition, FIG. 1 illustrates one example of a network configuration. Other network configurations may be utilized to allow communication between UAV 110, cellular network carrier 120, base stations 122a-c, and user device 130. The network environment 100 may include a different number of UAVs, user devices, base stations, and/or network management systems than that shown in FIG. 1.

Figure 2:
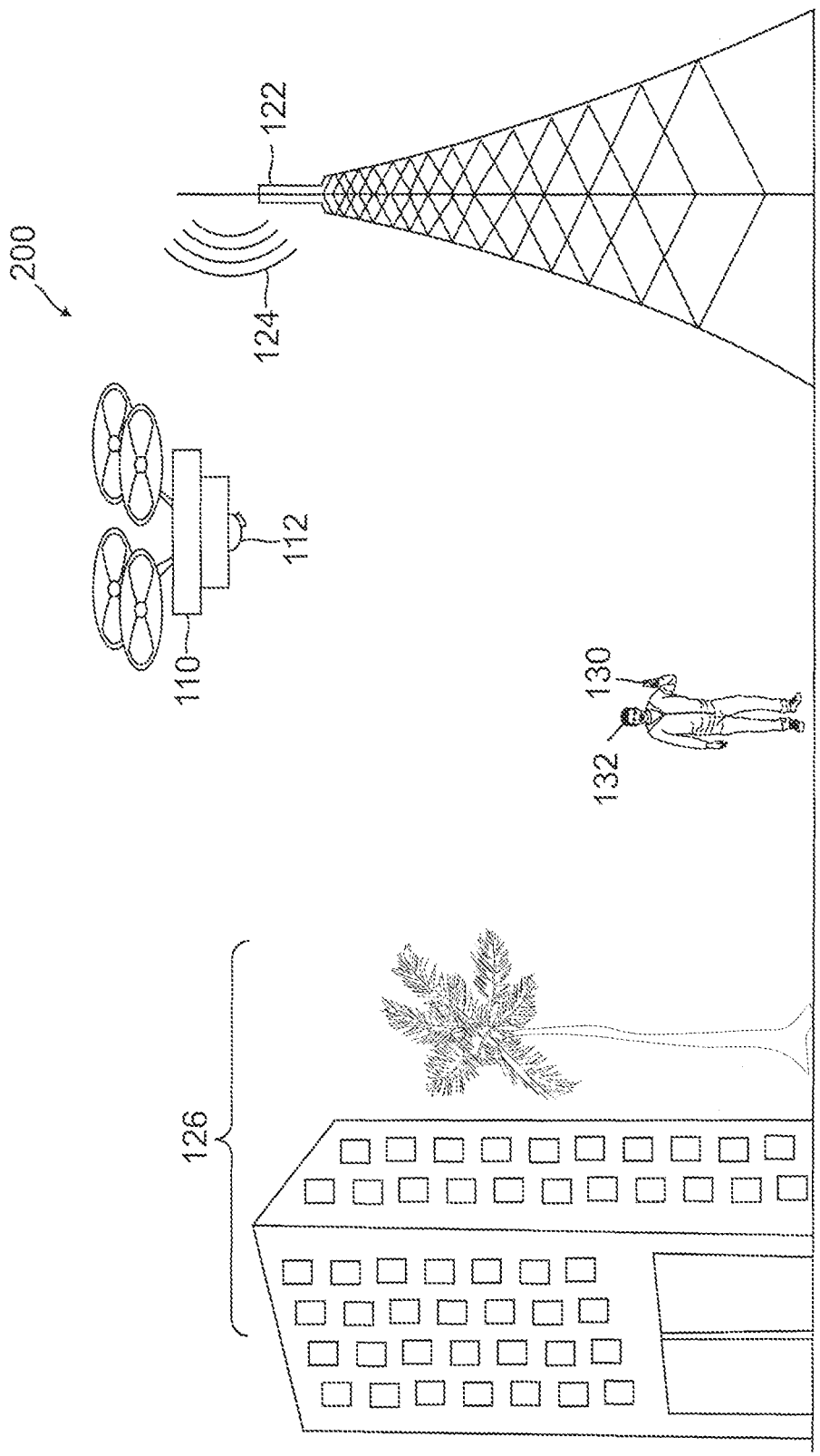
FIG. 2 illustrates an example of base station transmitting a cellular network signal to ground level and flight-altitude devices, according to an embodiment.

FIG. 2 illustrates an example of base station transmitting a cellular network signal to ground level and flight-altitude devices, according to an embodiment. Environment 200 of FIG. 2 includes UAV 110 having antenna 112, ground object 126, and user device 130 discussed in reference to network environment 100 of FIG. 1. Additionally, a base tower 122 having coverage area 124 corresponds generally to one of base stations 122a-c having coverage areas 124a-c, respectively, in network environment 100 of FIG. 1.

In various embodiments, environment 200 of FIG. 2 demonstrates signal differences between UEs located at ground level (e.g., user device 130) and UEs at altitude (e.g., UAV 110). As shown in FIG. 2, environment 200 includes base station 122 broadcasting radio signals within coverage area 124. The radio signals may correspond to a cellular network, or other network used for wireless communications. In general, base station 122 is optimized for transmission of radio signals in coverage area 124 at a ground level, such as two meters or similar off the ground where many ground based wireless devices operate. Thus, base station 122 and coverage area 124 are optimized to take into account ground objects 126, such as an office building and/or trees. Similarly, other human made or nature geographical objects and conditions may similarly affect radio signals from base station 122 in coverage area 124. Thus, user 132 utilizing user device 130 may receive optimized radio signal coverage for the wireless network from base station 122.

However, UAV 110 may be flying at an altitude where ground objects 126 do not impede radio signal transmissions from base station 122 within coverage area 124. Additionally, at the altitude, other factors may influence signal transmissions, interferences, and/or messaging on the cellular network provided by base station 122. In order to determine, record, and map the differences in signal transmissions and/or interferences at altitudes, UAV 110 may be equipped with antenna 112, which may be receptive to the radio signals transmitted by base station 122 at altitude and record signal readings, diagnostics, performance, and/or interferences while travelling a route at, nearby, and/or around base station 122. Antenna 112 may therefore record differences between signal propagation from base station 122 at an altitude where the radio signal is affected by different factors than ground objects 126. Once detected and recorded, UAV 110 may transmit the data on radio signal reception to one or more processing entities for determination of problem areas in cellular network signals at one or more altitudes and mapping of the problem areas.

Figure 3:
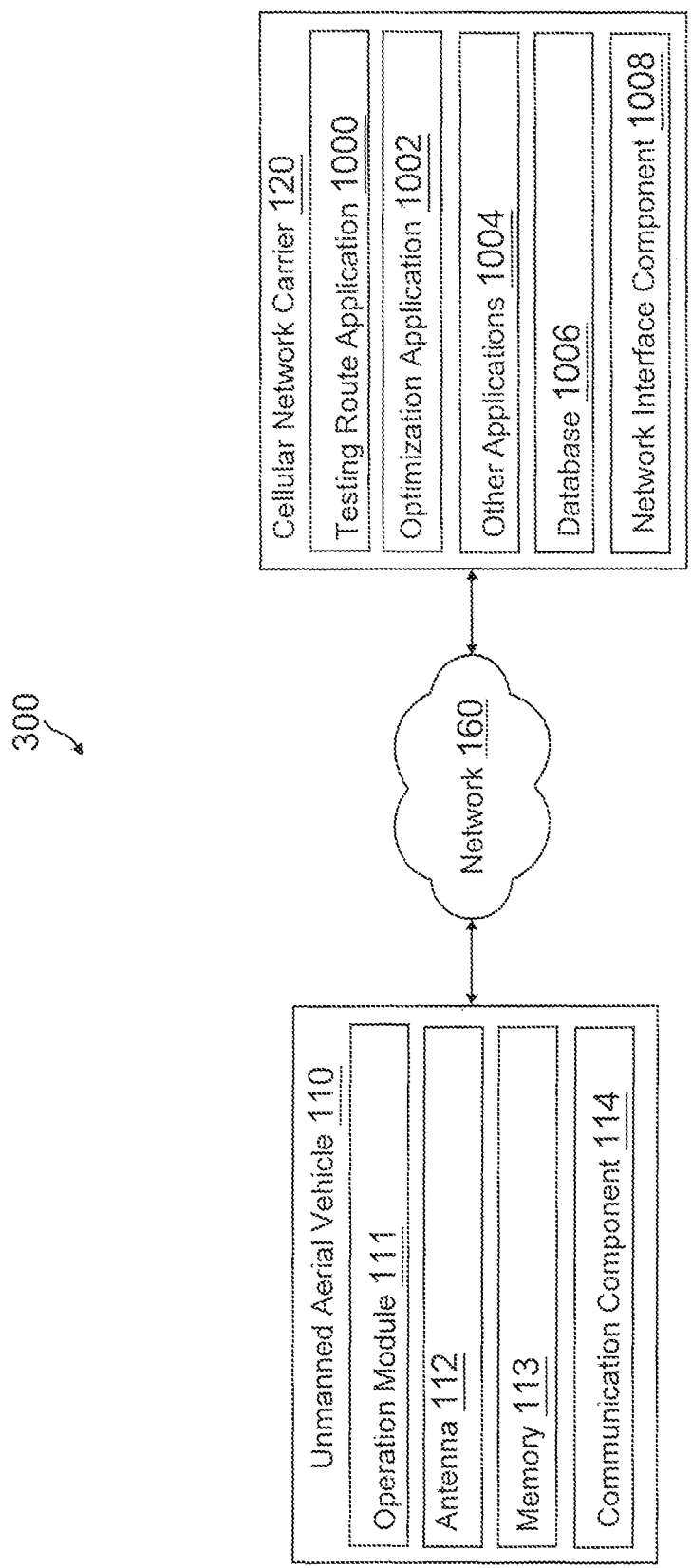
FIG. 3 illustrates a block diagram of device communicating with an entity for testing and mapping of network connectivity by a UAV, according to an embodiment.

FIG. 3 illustrates a block diagram of device communicating with an entity for testing and mapping of network connectivity by a UAV, according to an embodiment. System 300 includes unmanned aerial vehicle (UAV) 110 and cellular network carrier 120 in communication over a network 160. UAV 110 and cellular network carrier are discussed in reference to network environment 100 of FIG. 1. In this regard, cellular network carrier 120 may instruct UAV 110 to execute one or more flight routes and collect cellular network information. The cellular network information may be communicated from UAV 110 to cellular network carrier 120 for signal propagation planning and mapping of cellular network signals at one or more altitudes travelled by UAV 110 and/or other UAVs.

UAV 110 and cellular network carrier 120 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 160.

UAV 110 may be implemented as a UAV, UAS, drone, or other aerial vehicle that may utilize appropriate hardware and software configured for wired and/or wireless communication with cellular network carrier 120. Although only one UAV is shown, a plurality of UAVs may function similarly. UAV 110 of FIG. 1 contains an operation module 111, antenna 112, a memory 113, and a communication component 114. Operation module 111 may correspond to executable processes, procedures, and/or applications with associated hardware to operate UAV 110, such as a flight controller and/or navigation component or unit. In other embodiments, UAV 110 may include additional or different modules having specialized hardware and/or software as required.

Operation module 111 may correspond to one or more processes to execute modules and associated devices of UAV 110 to operate and navigate UAV 110, for example, to travel one or more flight paths in order to collect cellular network information. In this regard, operation module 111 may be configured to facilitate navigation of UAV 110, e.g., take off, landing, and flight of UAV 110, which may include execution of the flight path(s) or route(s) to collect the cellular network information. Operation module 111 may include any appropriate avionics, control actuators, and/or other equipment, along with associated logic, circuitry, interfaces, memory, and/or code. Additionally, operation module 111 may include a controller that receives flight route information from one or more sources, including memory 113 and/or external controller (e.g., set instructions from cellular network carrier 120 and/or inflight navigation/instructions from an operator) that operates UAV 110. Thus, operation module 111 may be fed flight controls, paths, and/or routes from one or more of memory 113 and/or communication component 114.

Antenna 112 may be utilized to detect cellular network information, for example, by receiving power (e.g., radio signals) from one or more base stations or other cellular network signal propagation source. Antenna 112 may sense the radio signals, and be used to record the radio signals along with associated information (e.g., position information) to memory 113 for storage and use. Antenna 112 may be contained within a housing of UAV 110 (e.g., embedded within the housing and/or circuitry of UAV 110), or disposed (e.g., mounted) outside a housing of UAV 110 as an attachable and/or removable module. In some cases, the antenna 112 may be movable along and/or rotatable about one, two, or three axes. In other cases, the antenna 112 may be fixed (e.g., not movable and not rotatable). Antenna 112 may correspond to a specialized cellular technology (e.g., using LTE or other cellular technology communication signal) test device that may be mounted to the UAV(s) (e.g., as a separate connected module or component), or a specialized Internet of Things (IoT) cellular (e.g., similarly using LTE or other cellular technology communication signal) radio unit can be embedded inside the UAV, which uses the cellular radio coverage of the cellular network.

Antenna 112 may be used to measure signal strength, signal diagnostics, and/or interferences of cellular tower signals for a cellular network. The signal strength may be, or may be based on, measures such as received signal strength indicator (RSSI), reference signal received power (RSRP), reference signal received quality (RSRQ), signal-to-noise ratio (SNR), signal-to-interference-plus-noise ratio (SINR), and/or other measures. Additionally, antenna 112 may be used to message with one or more of base stations to analyze message reception, clarity, and/or other measurements, as well as detect issues with messaging due to interference.

UAV 110 may further include memory 113, such as a transitory and/or non-transitory memory of UAV 110, which may store various applications and data and be utilized during execution of various modules of UAV 110. Thus, memory 113 may include, for example, data utilized by operation module 111, including flight data and/or instructions, as well as operating systems and controls for UAV 110. Information detected by antenna 112 may be stored to memory 113, including cellular network information and associated position information during collection of cellular network information. Memory 113 may also include received data, including flight path or route changes, instructions and deviations from flight routes, and other necessary control information.

UAV 110 includes at least one communication component 114 adapted to communicate with cellular network carrier 120. In various embodiments, communication component 114 may include a DSL (e.g., Digital Subscriber Line) modem, a PSTN (Public Switched Telephone Network) modem, an Ethernet device, a cellular technology signal/network device (e.g., 3G, 4G, 5G, and/or other 3GPP-based cellular network), other a broadband device, a satellite device and/or various other types of wired and/or wireless network communication devices including microwave, radio frequency, infrared, Bluetooth, and near field communication devices.

Cellular network carrier 120 may be maintained, for example, by a mobile services carrier, telecommunication provider, or other cellular network providing entity that provides one or more networks for use by users through one or more devices. In this regard, cellular network carrier 120 includes one or more processing applications which may be configured to interact with UAV 110 to facilitate network mapping at altitude, altitude problem spot determination, and network optimization for UAVs operating at an altitude through collecting cellular network information during operation of UAV 110. Although cellular network carrier 120 is described as being provided by a telecommunication entity, in other embodiments, cellular network carrier 120 may be maintained by or include other types of service provider providing smaller scale or different wireless networks.

Cellular network carrier 120 of FIG. 1 includes a testing route application 1000, an optimization application 1002, other applications 1004, a database 1006, and a network interface component 1008. Testing route application 1000, optimization application 1002, and other applications 144 may correspond to executable processes, procedures, and/or applications with associated hardware. In other embodiments, cellular network carrier 120 may include additional or different modules having specialized hardware and/or software as required.

Testing route application 1000 may correspond to one or more processes to execute modules and associated specialized hardware of cellular network carrier 120 to determine one or more flight routes and provide the flight routes to UAV 110 for execution and collection of cellular network information. In this regard, testing route application 1000 may correspond to specialized hardware and/or software to determine potential flight paths, including navigation in three dimensions (e.g., latitude, longitude, and altitude) of UAVs in order to collect information necessary to map a cellular network in 3D along one or more altitudes. The flight routes may be determined by testing route application 1000 based on potential use of UAVs at the altitudes and/or through the routes/locations of the flight routes. For example, the flight routes may be selected to map an area in 3D based on future use of UAVs and other drone devices within the area mapped or having collected data for after execution of the flight routes by UAV 110. The flight routes may be determined by testing route application 1000 at potential problem areas based on locations of one or more base stations and/or signal propagation from the base stations. Once determined by testing route application 1000, the flight route(s) may be communicated to UAV 110, for example, through a direct wired or wireless connection and/or network 160. In various embodiments, testing route application 1000 may provide instructions for a flight route during use and operation of UAV 110, which may be provided in real-time based on updates to the flight route and/or control of UAV 110 by a human operator or requirements of testing route application 1000.

In various embodiments, testing route application 1000 may include one or more modules for fleet management and/or management of multiple UAVs, including UAV 110. For example, the fleet management module and associated components may coordinate activities of multiple UAVs necessary for route mapping and determination of carrier signal coverage, interference, and loss at altitude. The fleet management module may provide route mapping for multiple UAVs, which may be used to avoid collision and properly map cellular coverage at altitude. The fleet management module may therefore determine multiple routes and multiple altitudes for a fleet of UAVs, which may then be executed and cellular coverage (e.g., signal strength, interference, and/or loss) at the altitudes may be determined using antennas of the UAVs. The data on the cellular coverage mapped by the fleet of UAVs may then be mapped in 3D, as discussed herein.

Optimization application 1002 may correspond to one or more processes to execute modules and associated specialized hardware of cellular network carrier 120 to receive cellular network information and plot or map the cellular network information to identify problem spots or locations in three dimensions (e.g., problems in interference between two or more base stations or other effects, inconsistent, incorrect, or missing messaging, and/or diagnostic or performance issues in radio signal reception by antenna 112 of UAV 110). In this regard, testing route application 1000 may correspond to specialized hardware and/or software to receive the cellular network information, either in real-time over a stream of data from UAV 110 while UAV 110 executes a flight path, or after completion of a flight path and landing/retrieval of UAV 110 and the associated data. Optimization application 1002 may then process the data by identifying the locations in 3D on a map of the executed flight route and/or cellular network coverage that have problem areas. As discussed herein, the problem areas are areas that may indicate issues with network connectivity and/or messaging, for example, through issues in radio signal reception, messaging, and/or performance, including interference between multiple radio signals and/or caused by objects or occurrence at altitude. Optimization application 1002 may map the problem areas in 3D to generate a map of the cellular network at altitude. Optimization application 1002 may then provide the map for signal propagation planning and/or optimization of cellular radio coverage and signal transmissions from one or more base stations.

In various embodiments, cellular network carrier 120 includes other applications 1004 as may be desired in particular embodiments to provide features to cellular network carrier 120. For example, other applications 1004 may include security applications for implementing server-side security features, programmatic applications for interfacing with appropriate application programming interfaces (APIs) over network 160, or other types of applications. Other applications 144 may contain software programs, executable by a processor, including a graphical user interface (GUI), configured to provide an interface to the user when accessing cellular network carrier 120. Other applications 1004 may also provide applications used to optimize a wireless cellular network, including tools for signal propagation tuning and/or adjustment of one or more base stations utilizing a map determined by optimization application 1002. In various embodiments where not provided by optimization application 1002, other applications 1004 may include connection and/or communication applications, which may be utilized to communicate information over network 160, including provision, use, and maintenance of a cellular network or other wireless network.

Additionally, cellular network carrier 120 includes database 1006. As previously discussed, UAV 110 may provide cellular network information to cellular network carrier 120, which may be stored to database 1006. Additionally, database 1006 may further include 3D maps of a cellular network determined using the cellular network information, which may include highlights or identification of problem areas at altitude caused by radio signal transmissions from one or more base stations at an altitude traveled by one or more UAVs. Database 1006 may also store flight routes determined by testing route application 1000, which may be transmitted to one or more UAVs for execution.

In various embodiments, cellular network carrier 120 includes at least one network interface component 1008 adapted to communicate UAV 110 over network 160. In various embodiments, network interface component 1008 may include a DSL (e.g., Digital Subscriber Line) modem, a PSTN (Public Switched Telephone Network) modem, an Ethernet device, a cellular technology signal/network device (e.g., 3G, 4G, 5G, and/or other 3GPP-based cellular network), other a broadband device, a satellite device and/or various other types of wired and/or wireless network communication devices including microwave, radio frequency, infrared, Bluetooth, and near field communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 300.

Figure 4:
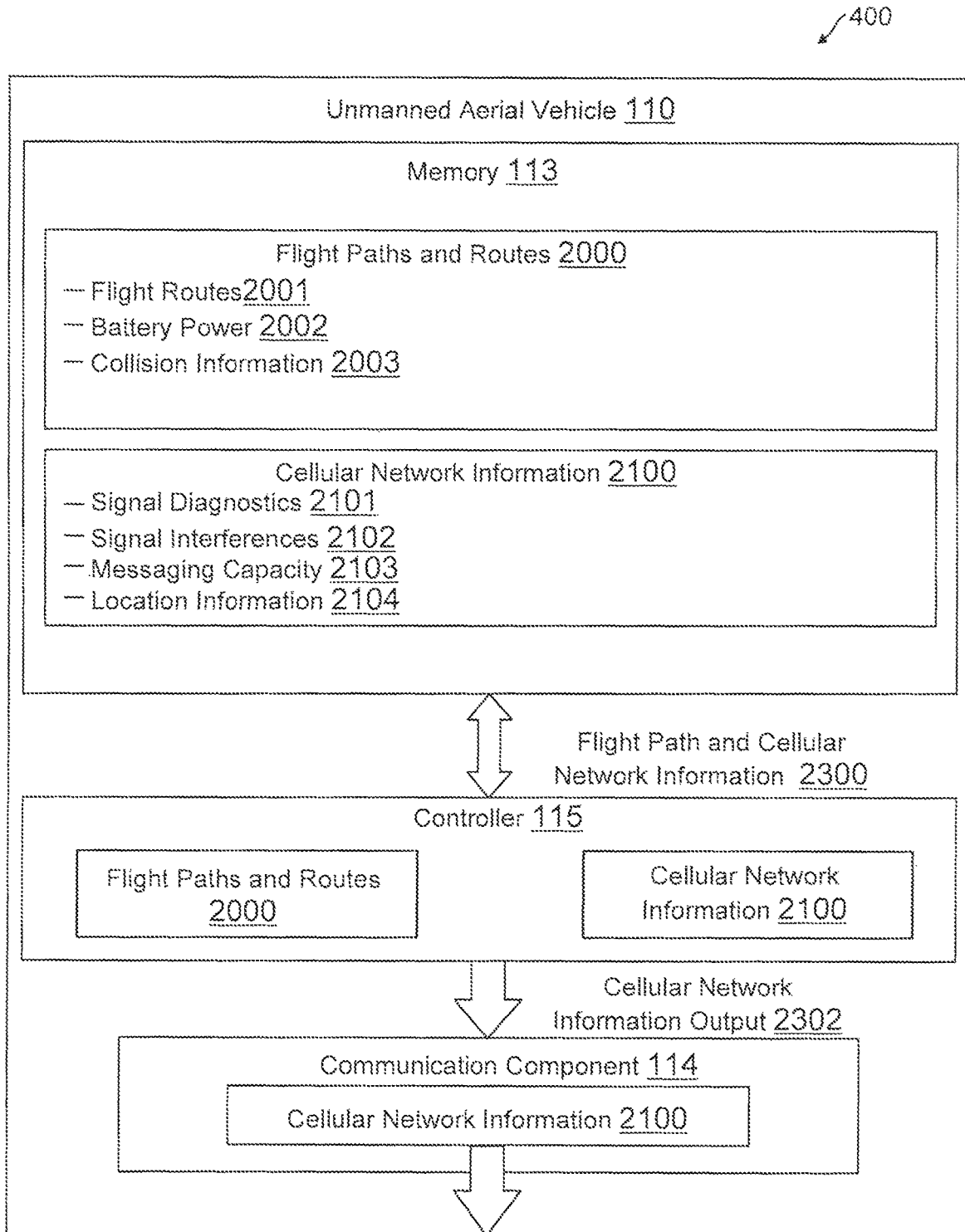
FIG. 4 illustrates a block diagram of an exemplary device for testing and mapping of network connectivity by a UAV, according to an embodiment.

FIG. 4 illustrates a block diagram of an exemplary device for testing and mapping of network connectivity by a UAV, according to an embodiment. Not all of the depicted components may be required, however, and one or more embodiments may include additional components shown in the additional Figures described herein. Variations in the arrangement and type of the components may be made without departing from the spirit or scope of the claims as set forth herein. Additional components, different components, and/or fewer components may be provided. For explanatory purposes, controller 115 of UAV 110 is described herein with reference to network environment 100 of FIG. 1 and system 300 of FIG. 3; however, controller 115 is not limited to network environment 100 of FIG. 1 and/or and system 300 of FIG. 3.

UAV 110 may include memory 113, communication component 114, and controller 115. Controller 115 may implement any control and feedback operations appropriate for interacting with the avionics, control actuators, and/or other equipment included in the flight control unit to fly UAV 110, including, but not limited to, taking off, landing, and/or setting/adjusting direction, velocity, and/or acceleration of UAV 110. In some cases, controller 115 may receive commands from user devices, base stations, and/or a cellular network carrier to, for example, configure and execute a flight plan (e.g., program a flight path), adjust a programmed flight path, deploy UAV 110, land UAV 110, navigate UAV 110, and/or other commands that facilitate navigating UAV 110 and utilizing UAV 110 to perform an action. In some cases, controller 115 may receive commands to move and/or rotate UAV 110 and/or a component thereof (e.g., an antenna). Controller 115 may include an LTE CAT-M IoT device that may be utilized for flight control of UAV 110. The LTE Cat-M IoT device may provide increased power capabilities and flight/operation length by reducing power consumption through limiting bandwidth and/or data transfer speed. Further, a separate battery may be provided for flight control, so that UAV 110 may be able to communicate with an entity, such as cellular network carrier 120 in the case of error, power failure, or other issues during flight.

Thus, memory 113 may include flight paths and routes 2000 that may be output to controller 115 at step 2300 during data transfers for flight path and cellular network information. Flight paths and routes 2000 may include information for flight routes 2001, battery power 2002, and collision information 2003 for operation of UAV 110. Controller 115 may further be utilized to monitor (e.g., autonomously monitor) a current position of UAV 110. Controller 115 may include, or may be in communication with, a GPS that provides the position of UAV 110. In some cases, controller 115 may implement location determination techniques. Thus, controller 115 may determine a positional difference between UAV 110 and a base station based on the position information of UAV 110 and the base station. Controller 115 may then execute flight paths and routes accordingly to navigate UAV 110.

Controller 115 may also receive cellular network information, for example, detected radio signals for a cellular network from an antenna attached to or embedded within UAV 110. At step 2300, cellular network information 2100 may be stored to memory 113, including signal diagnostics 2101, signal interferences 2102, messaging capacity 2103, and/or location information 2104.

Communication component 114 may implement appropriate physical layer(s) and protocol stack(s) to enable communication between UAV 110 and base stations and/or a cellular network carrier. For example, communication component 114 may include an LTE transceiver module for implementing an LTE physical layer and LTE protocol stack, and/or any other 3G, 4G, and/or 5G transceiver module(s), and/or satellite network transceiver module(s), and/or other transceiver module(s) associated with other wireless protocols/applications. Communication component 114 may allow UAV 110 to transmit messages to and/or receive messages. Controller 115 may further cause output of cellular network information at step 2302 utilizing communication component 114. Communication component 114 may transmit cellular network information 2100 in real-time streaming to a server, or may await retrieval of UAV 110 and request for cellular network information 2100 from a processing entity.

While an example manner of implementing UAV 110 is illustrated in FIG. 4, one or more of the components (e.g., elements, processes, and/or devices) illustrated in FIG. 4 may be combined, divided, re-arranged, omitted, eliminated, and/or implemented in any other way. Further, the components of UAV 110 in FIG. 4 may be implemented by hardware, software, firmware, and/or any combination of hardware, software, and/or firmware. Thus, for example, any of the components of UAV 110 may be implemented by one or more analog and/or digital circuits, logic circuits, programmable processors, application specific integrated circuits (ASICs), programmable logic devices (PLDs), and/or field programmable logic devices (FPLDs). In this regard, when implemented using circuitry, the components of UAV 110 may be referred to as UAV processing circuit, communication transceiver circuit, mobility controller circuit, and autonomous positioner circuit, respectively. When reading any claims as set forth herein to cover purely software and/or firmware implementations, at least one of the components of UAV 110 is hereby expressly defined to include a tangible computer readable storage device or storage disk such as a memory, digital versatile disk (DVD), compact disk (CD), a Blu-ray Disc™, and/or other storage device/disk storing the software and/or firmware.

Figure 5:
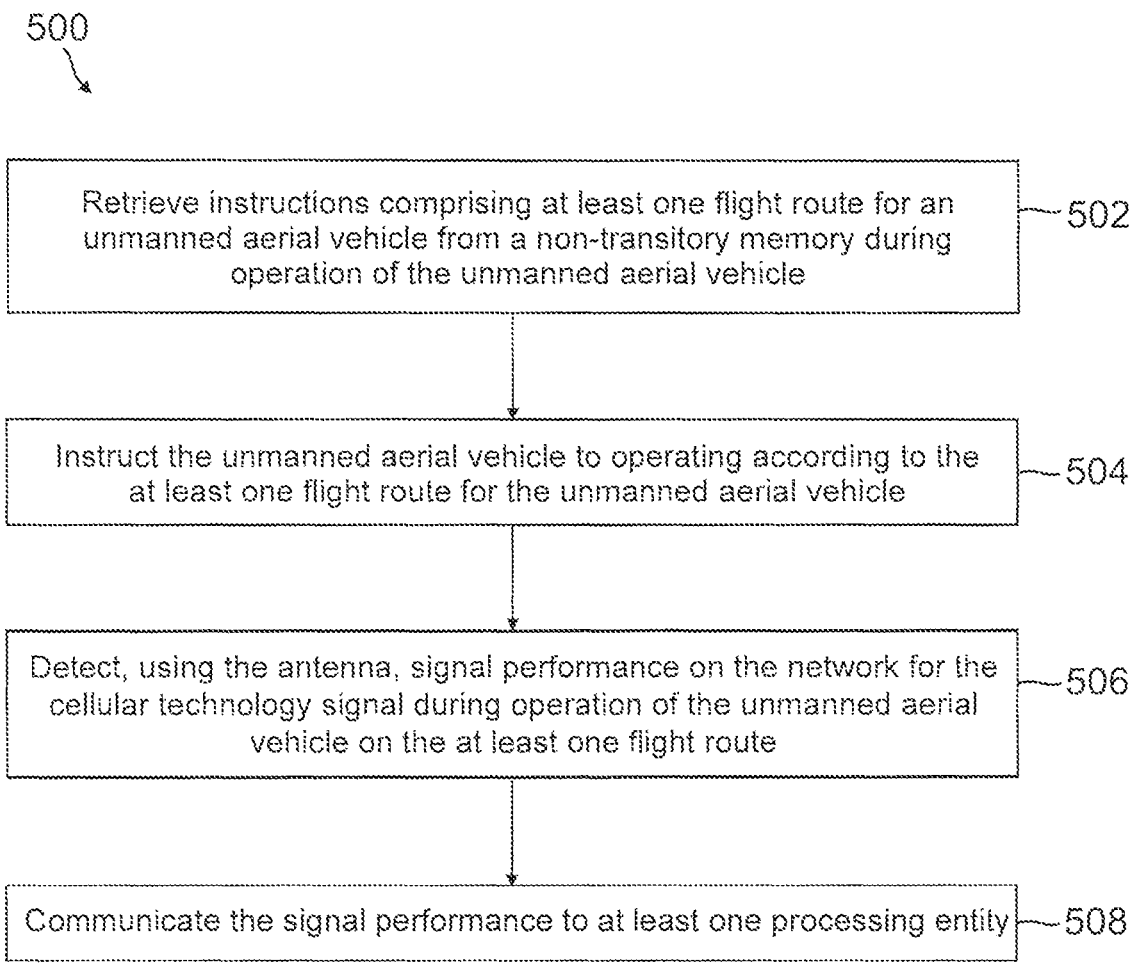
FIG. 5 illustrates a flow diagram for testing and mapping of network connectivity by a UAV, according to an embodiment.

FIG. 5 illustrates a flow diagram for testing and mapping of network connectivity by a UAV, according to an embodiment. Note that one or more steps, processes, and methods described herein in flowchart 500 may be omitted, performed in a different sequence, or combined as desired or appropriate.

At step 502, instructions are retrieved from a non-transitory memory during operation of an unmanned aerial vehicle, where the instruction comprise at least one flight route for the unmanned aerial vehicle. The at least one flight route may be based on an altitude having signal interference from at least two base stations transmitting the cellular technology signal for the network and a ground level having geographic objects affecting signal coverage for the network. Moreover, information for the at least one flight route may be received from a cellular network provider during the travel on the travel route. At step 504, the unmanned aerial vehicle is instructed to operate according to the at least one flight route for the unmanned aerial vehicle.

At step 506, signal performance on the network for a cellular technology signal is detected during operation of the unmanned aerial vehicle on the at least one flight route, using, for example, an antenna configured to detect cellular technology signal propagation of a network for the cellular technology signal (e.g., to detect cellular signals for the network). The cellular technology signal may correspond to a 3G, 4G, 4G Long Term Evolution (LTE), or 5G signal. The device including the antenna may be one of mounted to the unmanned aerial vehicle or embedded within the unmanned aerial vehicle. Thus, the device may be mounted to the unmanned aerial vehicle or embedded within the unmanned aerial vehicle. Moreover, the device may correspond to a specialized cellular technology test device or a specialized Internet of Things (IoT) cellular radio unit. The device or a UAV including the device may also include at least one collision detection sensor configured to prevent collisions with a manned flying vehicle or another unmanned aerial vehicle, as well as a rechargeable battery configured to provide power to the device and the unmanned aerial vehicle. The battery may be powered and/or charged by a photovoltaic power charging panel configured to provide power to recharge the rechargeable battery.

Next at step 508, the signal performance is communicated to at least one processing entity. The signal performance may be fed into an application for planning of signal propagation of the cellular technology signal on the network. The application may be executed by the processing entity corresponding to a cellular carrier providing the network for the cellular technology signal or a third party providing optimization services for the network. In various embodiments, communicating the signal performance to at least one processing entity may comprise streaming the signal performance to a server for a cellular carrier associated with the network for the cellular technology signal during operation of the unmanned aerial vehicle. The server may determine problem areas in signal coverage on the network using the signal performance, and plot the problem areas in a three-dimensional map of signal coverage of the cellular technology signal for the network. Additionally, the cellular carrier may optimize the signal coverage of the cellular technology signal for the network at a ground level and an altitude associated with the at least one flight route using the problem areas in the three-dimensional map.

Figure 6:
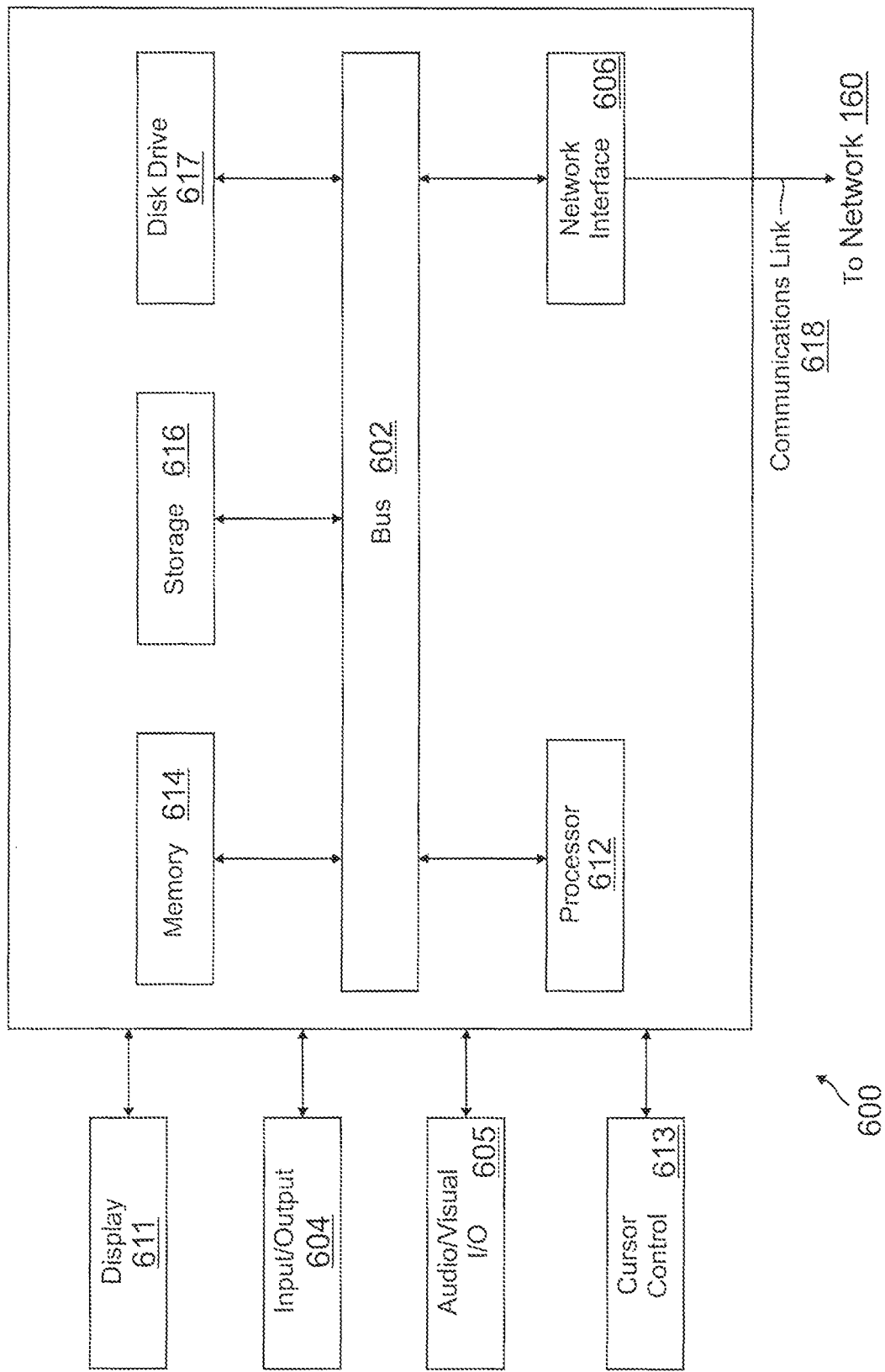
FIG. 6 illustrates a block diagram of an example of an electronic system with which one or more embodiments of the present disclosure may be implemented, according to an embodiment.

FIG. 6 illustrates a block diagram of an example of an electronic system with which one or more embodiments of the present disclosure may be implemented, according to an embodiment. In various embodiments, computer system 600 of FIG. 6 may comprise a personal computing device (e.g., smart phone, a computing tablet, a personal computer, laptop, a wearable computing device such as glasses or a watch, Bluetooth device, key FOB, badge, etc.) capable of communicating with the network. In other embodiments, a cellular network carrier or provider may utilize a network computing device (e.g., a network server) capable of communicating with the network similar to computer system 600. Moreover, one or more of the systems of a UAV may include and/or function similarly to computer system 600. It should be appreciated that each of the devices utilized by users and/or service providers (e.g., cellular network carriers) may be implemented as computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons, image, or links, and/or moving one or more images, etc., and sends a corresponding signal to bus 602. I/O component 604 may also include an output component, such as a display 611 and a cursor control 613 (such as a keyboard, keypad, mouse, etc.). An optional audio input/output component 605 may also be included to allow a user to use voice for inputting information by converting audio signals. Audio I/O component 605 may allow the user to hear audio. A transceiver or network interface 606 transmits and receives signals between computer system 600 and other devices, such as another communication device, service device, or a service provider server via network 160. In various embodiments, the transmission is wireless, although other transmission mediums and methods may also be suitable. One or more processors 612, which can be a micro-controller, digital signal processor (DSP), or other processing component, processes these various signals, such as for display on computer system 600 or transmission to other devices via a communication link 618. Processor(s) 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor(s) 612 and other components by executing one or more sequences of instructions contained in system memory component 614. Logic may be encoded in a computer readable medium, which may refer to any medium that participates in providing instructions to processor(s) 612 for execution. Such a medium may take many forms, including but not limited to, non-volatile media, volatile media, and transmission media. In various embodiments, non-volatile media includes optical or magnetic disks, volatile media includes dynamic memory, such as system memory component 614, and transmission media includes coaxial cables, copper wire, and fiber optics, including wires that comprise bus 602. In various embodiments, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
    adjusting, by a device comprising a processor of a drone, a flight route of the drone traveling at an altitude over terrain, wherein the altitude over terrain of the flight route and a position along the flight route are selected based on interference data caused by a physical object at ground level;
    in response to the adjusting of the flight route of the drone and in response to the drone adjusting the altitude over terrain, determining, by the device, via an antenna affixed to the drone, signal diagnostic data of signal interference associated with network equipment, wherein the determining is associated with the altitude over terrain and the position; and
    transmitting, by the device, the signal diagnostic data to service equipment, wherein the signal diagnostic data enables, and is used to determine, base station equipment performance over an area associated with a group of base station equipment, and wherein the signal diagnostic data is streamed to the service equipment.

2. The method of claim 1, wherein the signal diagnostic data further comprises signaling performance indications in a map of signal coverage by the group of base station equipment.

3. The method of claim 2, wherein the map of signal coverage comprises an indicator of a location of a signal blackout area of the signal coverage of the group of base station equipment based on a ground level object, and wherein the method further comprises:
    highlighting, by the device, the signal blackout area on a three-dimensional map.

4. The method of claim 1, wherein the flight route comprises different altitudes over terrain comprising the altitude over terrain, and wherein the signal diagnostic data enables the group of base station equipment to be tested at the different altitudes over terrain.

5. The method of claim 1, wherein a portion of the flight route is further traveled by a group of drones, and wherein the adjusting of the flight route is based on a use of a collision avoidance system to avoid collision between drones of the group of drones.

6. The method of claim 1, wherein the determining of the signal diagnostic data further comprises determining, by the device, the signal diagnostic data of signal interference received from the group of base station equipment at different positions along the flight route.

7. The method of claim 1, wherein the signal diagnostic data further comprises signal loss data from the group of base station equipment.

8. The method of claim 1, wherein the antenna of the drone comprises at least one of: a first antenna that implements a third generation network communication protocol, a second antenna that implements a fourth generation network communication protocol, a third antenna that implements a fourth generation long term evolution network communication protocol, a fourth antenna that implements a fifth generation network communication protocol, or an Internet of Things antenna of an Internet of Things device.

9. The method of claim 1, wherein the antenna of the drone is configured to communicate according to at least a fifth-generation network communication protocol.

10. A non-transitory machine-readable medium, comprising executable instructions that, when executed by a processor, facilitate performance of operations, the operations comprising:
    determining a geographic location based on a signal issue in a signal coverage associated with a group of cellular equipment;
    generating a flight route for a drone for detection of signal data associated with the geographic location of the signal issue;
    receiving, from the drone, the signal data representing performance conditions, including signal interference, associated with the group of cellular equipment, wherein the signal data is detected over an area while the drone executes an adjustment to the flight route at an altitude over terrain;

based on the signal data, determining signal performance data representative of the group of cellular equipment;

generating a three-dimensional map based on the signal performance data, wherein the three-dimensional map further comprises signal coverage data associated with the group of cellular equipment; and based on the three-dimensional map and the signal coverage data associated with the group of cellular equipment at ground level and the altitude over terrain maintained by the drone, changing base station equipment associated with the group of cellular equipment within the area.

11. The non-transitory machine-readable medium of claim 10, wherein the operations further comprise:

identifying a signal blackout area within the signal coverage data based on an identification of a ground level object; and highlighting the signal blackout area on the three-dimensional map.

12. The non-transitory machine-readable medium of claim 10, wherein the operations further comprise:

determining a frequency band for use by the group of cellular equipment based on the signal performance data; and plotting, on the three-dimensional map, the frequency band for use by the group of cellular equipment at the altitude over terrain.

13. The non-transitory machine-readable medium of claim 10, wherein the operations further comprise:

based on the three-dimensional map, selecting the base station equipment for use by the group of cellular equipment.

14. The non-transitory machine-readable medium of claim 10, wherein an antenna of the drone is configured to communicate according to a long-term evolution network communication protocol.

15. A system, comprising:

a processor; and a memory that stores executable instructions that, when executed by the processor, facilitate performance of operations, the operations comprising:

generating a flight path for an aerial equipment based on a location of a signal issue in a signal coverage associated with a group of network equipment;

transmitting the flight path to the aerial equipment for detection of interference data and signal loss data associated with the location of the signal issue;

receiving, from the aerial equipment, the interference data and the signal loss data for the group of network equipment over a geographic area based on an operation of the aerial equipment over the geographic area at an altitude over terrain, wherein the interference data is generated by cellular signaling from at least two of the group of network equipment situated with the geographic area, wherein the signal loss data is representative of signal loss due to at least one ground level object during the operation of the aerial equipment, and wherein the operation of the aerial equipment comprises modifying, by the aerial equipment, of the altitude over terrain of the aerial equipment over the geographic area in accordance with the flight path;

based on the interference data and the signal loss data, determining a signal coverage of the group of network equipment situated within the geographic area; and based on the signal coverage, designating one of the at least two of the group of network equipment for connectivity to the group of network equipment by a group of aerial equipment comprising the aerial equipment.

16. The system of claim 15, wherein the operations further comprise:

based on the interference data and the signal loss data, providing a plotting of signal propagation representative of the group of network equipment.

17. The system of claim 16, wherein the plotting of the signal propagation represents a three-dimensional mapping of the group of network equipment.

18. The system of claim 15, wherein the operations further comprise:

receiving a no-flight location along the flight path.

19. The system of claim 18, wherein the operations further comprise:

determining an adjustment to the flight path based on the no-flight location.

20. The system of claim 19, wherein the operations further comprise:

transmitting the adjustment to the aerial equipment at the altitude over terrain.

* * * * *